US008370434B2

United States Patent
Yoon

(10) Patent No.: US 8,370,434 B2
(45) Date of Patent: Feb. 5, 2013

(54) WORKFLOW SYSTEM AND METHOD OF CONTROLLING THE SAME

(75) Inventor: Ha Young Yoon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 11/968,751

(22) Filed: Jan. 3, 2008

(65) Prior Publication Data

US 2008/0162626 A1   Jul. 3, 2008

(30) Foreign Application Priority Data

Jan. 3, 2007   (KR) .................. 10-2007-0000673
Dec. 14, 2007   (KR) .................. 10-2007-0130956

(51) Int. Cl.
*G06F 15/16*   (2006.01)
(52) U.S. Cl. ........ 709/205; 709/203; 709/217; 709/219; 358/1.13; 358/1.15
(58) Field of Classification Search .......... 709/203, 709/205, 223, 217, 219; 715/736; 358/1.13, 358/1.14, 1.15
See application file for complete search history.

(56) References Cited

U.S. PATENT DOCUMENTS

| | | | | |
|---|---|---|---|---|
| 7,525,676 B2* | 4/2009 | Pesar | ........................ | 358/1.13 |
| 7,826,101 B2* | 11/2010 | Yano et al. | ................. | 358/403 |
| 2006/0085516 A1* | 4/2006 | Farr et al. | ...................... | 709/217 |
| 2006/0178924 A1 | 8/2006 | Yagiura | | |
| 2006/0238789 A1* | 10/2006 | Pesar | ......................... | 358/1.13 |
| 2007/0024901 A1* | 2/2007 | Kayama | ....................... | 358/1.15 |
| 2007/0028207 A1* | 2/2007 | Nakata et al. | ................. | 717/100 |
| 2007/0136117 A1* | 6/2007 | Matsueda | ........................ | 705/7 |
| 2007/0139692 A1* | 6/2007 | Martin et al. | ................ | 358/1.15 |

FOREIGN PATENT DOCUMENTS

| | | |
|---|---|---|
| CN | 1486466 | 3/2004 |
| JP | 11-73335 | 3/1999 |

OTHER PUBLICATIONS

Chinese Office Action issued Jun. 22, 2010 in CN Application No. 200810095108.8.
Chinese Office Action issued Mar. 2, 2011 in CN Application No. 200810095108.8.

* cited by examiner

*Primary Examiner* — Ramy M Osman
(74) *Attorney, Agent, or Firm* — Stanzione & Kim, LLP

(57) ABSTRACT

A workflow system includes a host computer connected between an image forming apparatus having no workflow function and a workflow server. The workflow server generates a work form of the image forming apparatus using capability information of the image forming apparatus stored in the host computer. A user makes a request to execute a work form registered in the workflow server using the host computer, and the image forming apparatus performs work according to the work form selected by the user. The work result of the image forming apparatus is sent to the workflow server through the host computer and the workflow server performs the remaining work which is not performed by the image forming apparatus.

10 Claims, 10 Drawing Sheets

WORKFLOW SYSTEM AND METHOD OF CONTROLLING THE SAME

CROSS-REFERENCE TO RELATED APPLICATIONS

This application claims priority under 35 U.S.C. §119(a) from Korean Patent Application No. 2007-130956, filed on Dec. 14, 2007, and Korean Patent Application No. 2007-000673, filed on Jan. 3, 2007, in the Korean Intellectual Property Office, the disclosures of which are incorporated herein in their entirety by reference.

BACKGROUND OF THE INVENTION

1. Field of the Invention

The present general inventive concept relates to a workflow system and a method of controlling the same, and more particularly, to a workflow system and method of controlling the same, which are capable of performing a workflow function using a multifunction device having no workflow function.

2. Description of the Related Art

In general, a multifunction device performs multiple functions, including a scanning function, a facsimile function, and a copy function. Recently, since a function to transmit document data and so on has been added to the multifunction device, workload of the multifunction device associated with peripherals has increased, and thus, a workflow has been introduced into the multifunction device in order to perform work efficiently.

A workflow multifunction device has a workflow function to process a workflow function in communication with a workflow server.

The workflow function of the multifunction device includes a function for transmitting scanned document data through a facsimile machine, a function for transmitting scanned document data through an electronic mail, a function for storing scanned document data in a folder, an optical character reader (OCR) function, and a file transfer protocol (FTP) function of document data.

However, in order to perform a workflow function, a conventional multifunction device should have the workflow function at the time of shipping products. The conventional multifunction device should further include a network function.

Accordingly, in a case where a multifunction device is connected to a host computer but does not have a work form to perform a function to connect to a workflow server over a network or does not have the workflow function at the time of shipping products, the workflow function cannot be performed.

SUMMARY OF THE INVENTION

The general inventive concept provides a workflow system and a method of controlling the same, which are capable of allowing an image forming apparatus having no work form to perform a workflow function and a network function to perform the workflow function Additional aspects and/or advantages of the general inventive concept will be set forth in part in the description which follows and, in part, will be obvious from the description, or may be learned by practice of the general inventive concept.

The foregoing and/or other aspects and utilities of the present general inventive concept are achieved by providing a workflow system including an image forming apparatus having no work form to perform a workflow function, a server to store a work form of the image forming apparatus, and a host computer connected between the image forming apparatus and the server, wherein the host computer sends a work form of the server to the image forming apparatus or sends a work result of the work form of the image forming apparatus to the server so as to perform the workflow function.

The host computer may include a workflow device program to allow the image forming apparatus to perform the workflow function.

The workflow device program may include a device connection unit to provide a user interface and a connection program to connect the image forming apparatus and the server, a capability storage unit to store information on capability of the image forming apparatus, a work form execution unit to provide a user interface and an execution program to execute the work form of the image forming apparatus, a workflow server communication unit to provide a communication program to communicate with the server, a user management unit to provide a user interface and a user management program to generate and manage user information, and a database to store the user information and information on connected devices.

The host computer may transform the work form of the registered image forming apparatus received from the server to a form which can be recognized by the image forming apparatus.

The workflow system may further include a client which is connected to the server so as to generate and register the work form of the image forming apparatus.

The foregoing and/or other aspects and utilities of the present general inventive concept are also achieved by providing a method of controlling a workflow system including an image forming apparatus having no work form to perform a workflow function, a server, and a host computer connected between the image forming apparatus and the server, the method including registering the image forming apparatus in the host computer, generating and registering a work form of the image forming apparatus in the server, and sending a work form selected from work forms registered in the server by a user to the image forming apparatus through the host computer and executing the work form.

The registering of the image forming apparatus may be performed by the user using a device adding wizard of the host computer.

The registering of the image forming apparatus may include storing capability information and detailed information of the image forming apparatus added by the device adding wizard in the host computer.

The capability information may include resolution of the image forming apparatus and the type of an image file, and the detailed information includes an IP address of the image forming apparatus.

The registering of the work form may include receiving capability information of the image forming apparatus from the host computer, selecting a parameter to define the work form according to the capability information of the image forming apparatus, and generating the work form using the selected parameter and adding the generated work form to a list.

The executing of the work form may include transforming setting information of the selected work form to a form which can be recognized by the image forming apparatus, and allowing the image forming apparatus to perform work according to the transformation.

The executing of the work form may further include allowing the server to perform the remaining work which is not performed by the image forming apparatus.

The foregoing and/or other aspects and utilities of the present general inventive concept are also achieved by providing a workflow system, including a plurality of devices without work forms to perform a workflow function, a host computer connected to the plurality of devices, and a workflow server to perform a workflow function, wherein the work flow server generates a work form for a selected one of the plurality of devices according to information provided by the host computer, and the host computer provides the work form to the selected device to perform a work.

The information provided may include capability information of the selected device.

The capability information may include a scan resolution and image file type of the selected device, and the workflow server may use these parameters to define the work form.

The selected device may provide the results of the performed work to the host computer and the host computer may send the results of the performed work to the workflow server.

The foregoing and/or other aspects and utilities of the present general inventive concept are also achieved by providing a method of controlling a workflow system, including; executing work functions directly at multifunction devices having workflow function capability; requesting through a host computer to a workflow server to transmit a work form for multifunction devices not having workflow function capabilities; and executing workflow functions by the multifunction devices not having work forms to provide workflow function capabilities by using the transmitted work forms.

BRIEF DESCRIPTION OF THE DRAWINGS

These and/or other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
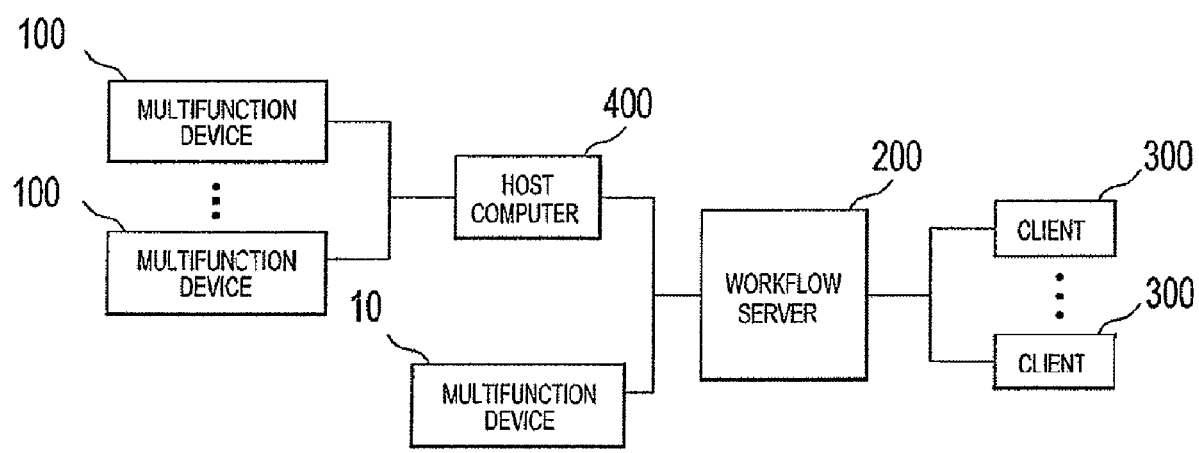
FIG. 1 is a block diagram illustrating a connection between a general multifunction device having no work form to perform a workflow function and a workflow server using a host computer, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Hereinafter, a workflow system and a method of controlling the same according to embodiments of the present general inventive concept will be described.

Figure 2:
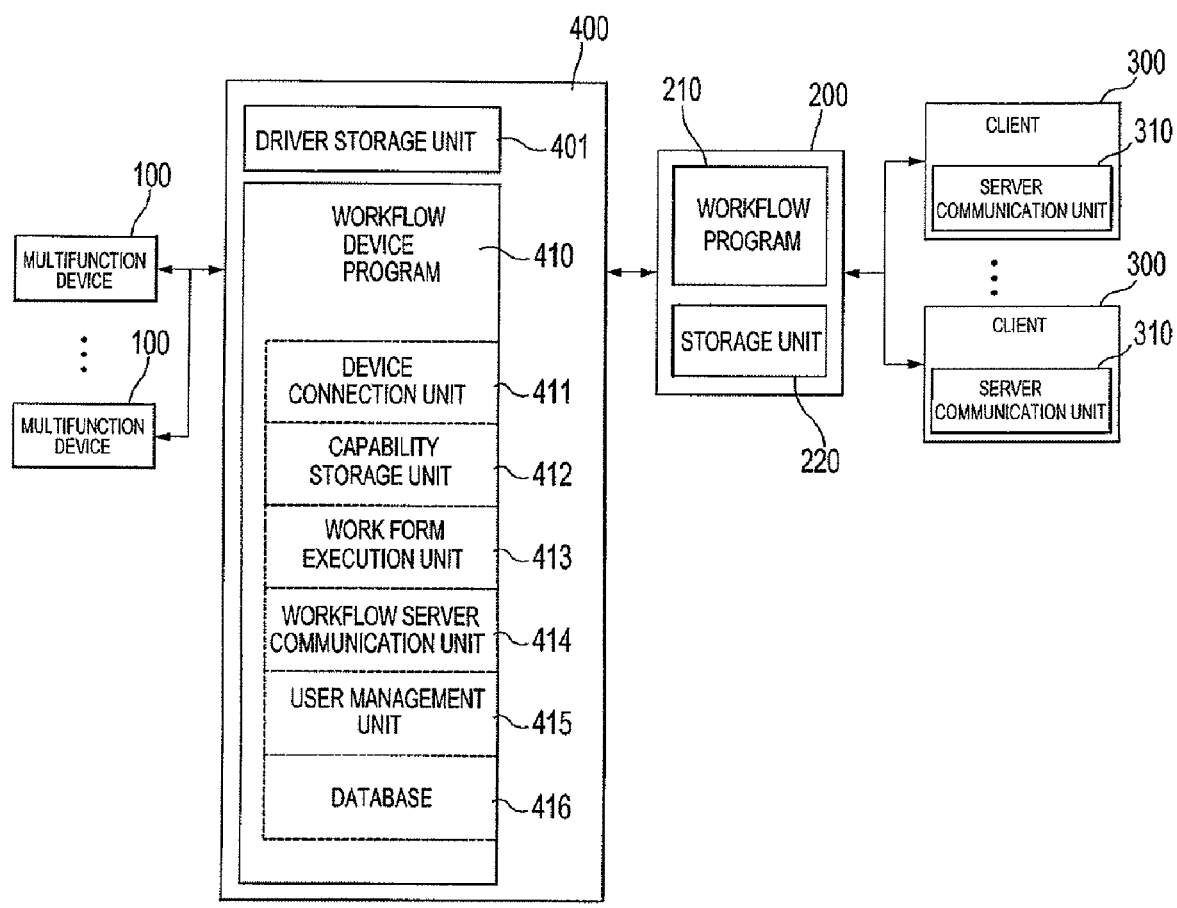
FIG. 2 is a detailed view illustrating in detail the configuration of the workflow system according to an embodiment of the present general inventive concept.

FIG. 1 is a block diagram illustrating a workflow system according to an embodiment of the present general inventive concept, and FIG. 2 is a detailed view illustrating in detail a configuration of the workflow system illustrated in FIG. 1.

As illustrated in FIG. 1, the workflow system according to the present embodiment may include general multifunction devices 100 each having no work form to perform a workflow function, a multifunction device 10 having a workflow function, a host computer 400, a workflow server 200, and clients 300.

An interaction between the workflow server 200 and the workflow multifunction device 10 having the workflow function is similar to that of the prior art and thus will be briefly described.

The workflow multifunction device 10 is connected to the workflow server 200 so as to make a request to execute a work form stored in a storage unit 220. The workflow server 200 operates a workflow server program 210 and executes a work form in response to the request.

Each of the general multifunction devices 100 does not have a work form to perform a workflow function and thus cannot perform the workflow function. Accordingly, the general multifunction devices 100 are connected to the workflow server 200 through the host computer 400 so as to perform the workflow function. In other words, the general multifunction devices 100 can obtain a work form from the workflow server 200, and then can perform a workflow function together with the host computer 400. A more detailed description is provided below.

The host computer 400 may include a driver storage unit 401 to store drivers of the multifunction devices and a workflow device program 410 to allow each of the general multifunction devices 100 to perform the workflow function.

The workflow device program 410 may include a device connection unit 411 to provide a user interface and a connection program to connect the multifunction devices 100 and the workflow server 200, a capability storage unit 412 to store capability information of the multifunction devices 100, such as the type of an image file and scan resolution according to models of the multifunction devices 100, and a work form execution unit 413 to provide a user interface and an execution program to execute work forms of the multifunction devices.

The workflow device program 410 may further include a workflow server communication unit 414 to provide a communication program to communicate with the workflow server 200, a user management unit 415 to provide a user interface and a user management program to generate and manage user information, and a database 416 to store information on connected devices, such as the multifunction devices and the user information.

The host computer 400 connects the general multifunction devices 100 and the workflow server 200 to communicate with each other using the workflow device program 410, provides necessary information in response to the request from the general multifunction devices 100 to the workflow server 200 at the time of generating the work form and performing the workflow function, and sends the work results of the multifunction devices to the workflow server 200.

Figure 3:
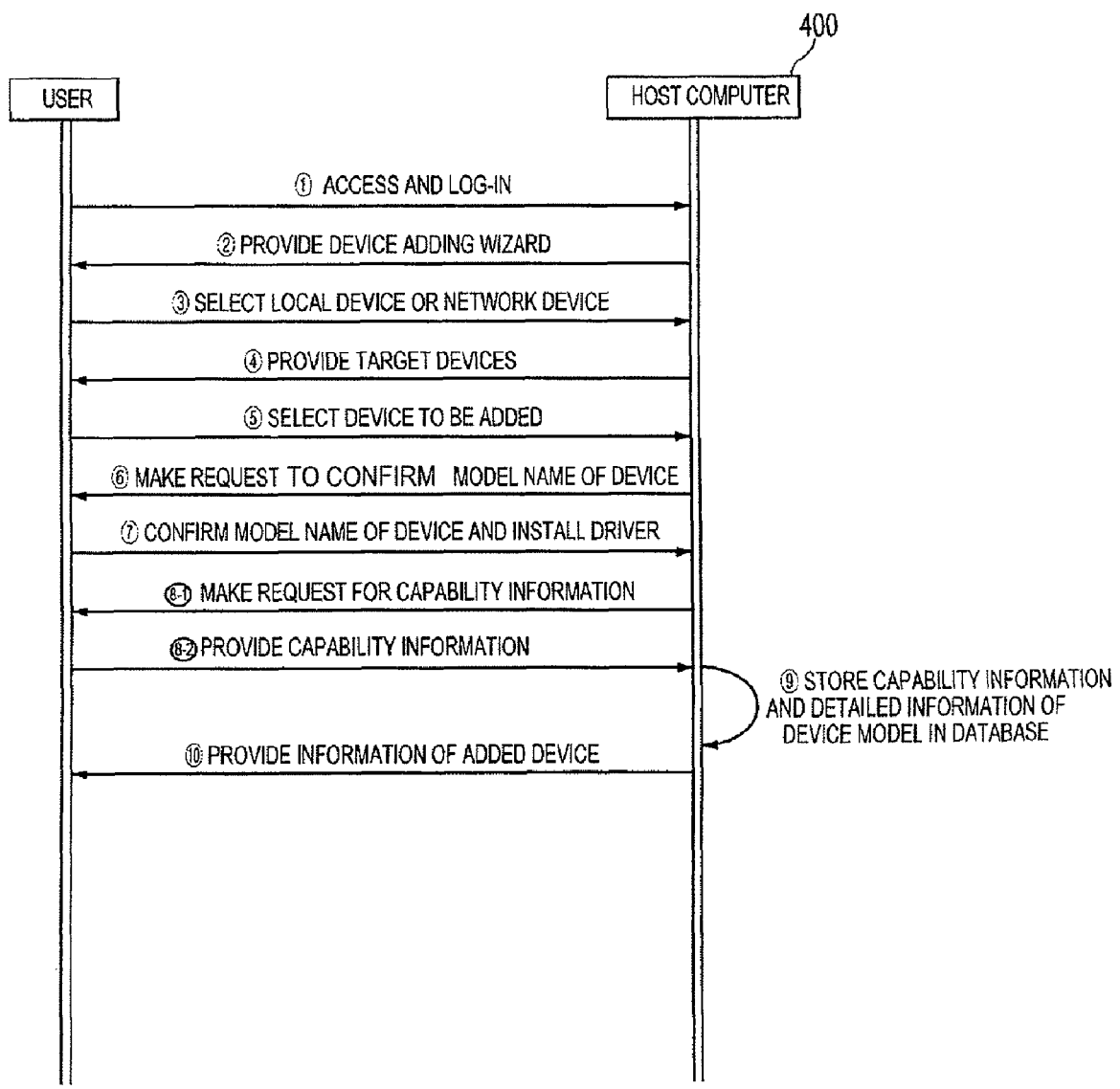
FIG. 3 is a view illustrating an operation to register a work form of the general multifunction device having no work form to perform a workflow function in the host computer according to an embodiment of the present general inventive concept.

An operation to register a general multifunction device 100 in the host computer 400 will be described with reference to FIG. 3. Here, the registration of the general multifunction device 100 in the host computer 400 indicates an operation to add an unregistered general multifunction device 100 as a new device.

When a user accesses and logs in to the host computer 400 and selects a device adding menu in a main menu provided by the host computer 400, the device connection unit 411 provides a device adding wizard. The user selects whether the multifunction device to be added is a local device or a network device, on a screen provided by the device adding wizard.

Then, the device connection unit 411 provides selected target devices. The user selects a device to be added from the target devices. Next, the host computer 400 makes a request to confirm a model name of the selected device, and notifies the user that a driver of the device selected by the user should be newly installed in the host computer 400 when the user confirms the model name of the device. The driver of the device which is newly installed is stored in the driver storage unit 401. The installation of the driver is not compulsory, that is, the driver is installed only when the driver of the device selected by the user is not included in the host computer.

Subsequently, the device connection unit 411 reads capability information of the device to be added from the capability storage unit 412. At this time, when the capability information is not stored, the user is requested to provide the capability information. When the capability information is acquired, the device connection unit 411 stores the capability information and detailed information of the device to be added in the database 416. The detailed information includes connection information of a network, such as an IP address of the device. The device connection unit 411 opens a device status window and provides and displays the added device on a screen. Then, the device adding wizard is finished.

Figure 4:
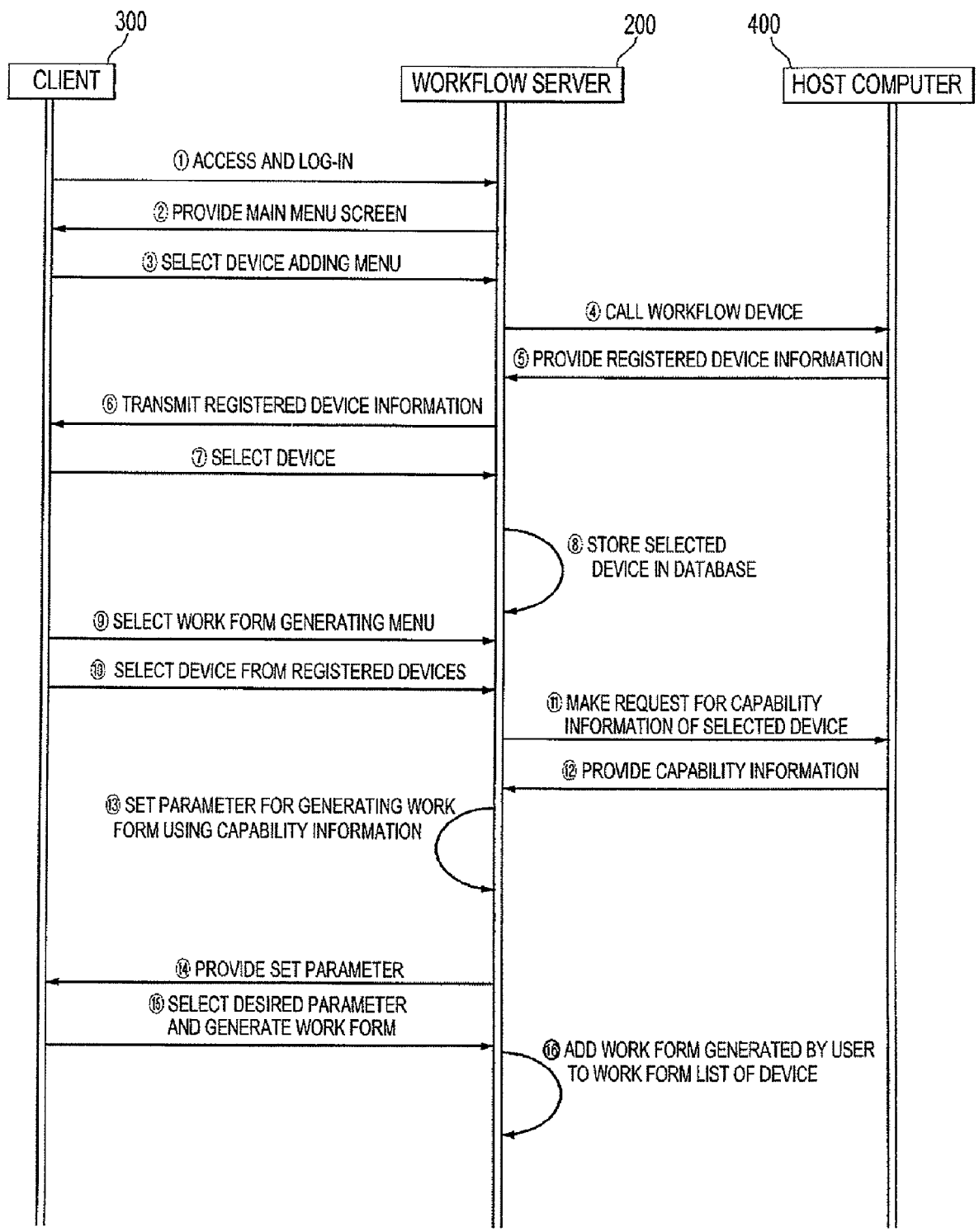
FIG. 4 is a view illustrating an operation to register a work form of the general multifunction device having no work form to perform a workflow function in the workflow server according to an embodiment of the present general inventive concept.

When the general multifunction device is registered in the host computer, an operation to add a work form, which is information to indicate the workflow of the general multifunction device, to the workflow server 200 is necessary. Accordingly, as illustrated in FIG. 4, an operation to generate a work form using a client 300 is necessary. At this time, the client 300 communicates with the workflow server 200 using a server communication unit 310.

Referring to FIG. 4, the client 300 accesses and logs in to the workflow server 200 and the workflow server 200 provides a main menu. The client 300 selects a device adding menu in the main menu, and the workflow server 200 calls the multifunction device having the workflow function through broadcasting in response to the selection of the client. At this time, by the calling of the workflow server 200, the host computer 400 transmits device information registered in the database 416 to the workflow server 200 through the workflow server communication unit 414. The workflow server 200 transmits the received device information to the client 300. The client 300 selects a general multifunction device having no work form to perform a workflow function, which is the device to be added, from the device information displayed on the screen.

When the device is selected by the client 300, the workflow server 200 stores the selected device in the storage unit 220. The client 300 selects a work form generating menu and selects a device, of which the work form is desired to be generated, from the registered devices. The workflow server 200 makes a request for the capability information of the selected device to the host computer 400. The workflow server communication unit 414 of host computer 400 transmits the capability information of the device registered in the database 416 to the workflow server 200.

The workflow server 200 sets a scan resolution and a type of the image file as parameters to define a work form which will be generated using the received capability information of the device, and provides the set parameters to the client 300. The client 300 selects a desired parameter from the received parameters, selects whether a transformation operation is performed, selects a destination, and generates the work form. The workflow server 200 stores the work form generated by the client 300 in the storage unit 220. The storage unit 220 adds the work form of the multifunction device generated by the client to a work form list of the device.

After the general multifunction device 100 is registered in the host computer 400 and the work form of the general multifunction device 100 is generated and registered, the general multifunction device can perform the workflow function.

Figure 5:
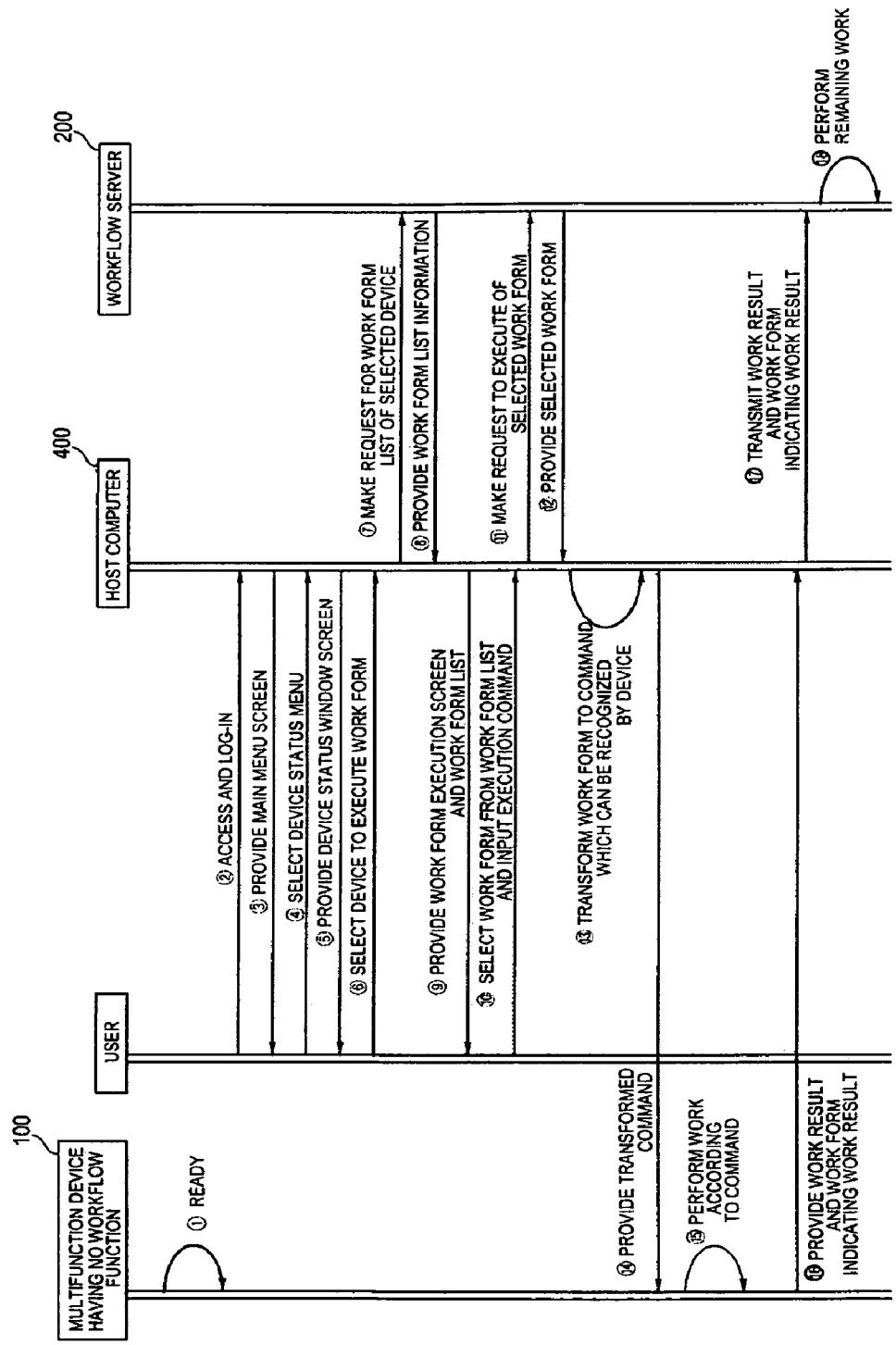
FIG. 5 is a view illustrating an operation to execute a work form of the general multifunction device having no work form to perform a workflow function according to an embodiment of the present general inventive concept.

Hereinafter, an operation to allow the user to perform the workflow function between the workflow server 200 and the general multifunction device 100 through the host computer 400 will be described with reference to FIG. 5.

When the general multifunction device 100 is ready to scan a document, the user accesses and logs in to the host computer 400. Then, the host computer 400 provides the main menu according to the request of the user.

When the user selects a device status menu in the main menu, host computer 400 provides a device status window screen. The user selects a general multifunction device 100 having no work form to perform a workflow function, which will perform the work function, and the host computer 400 makes a request for the work form list of the selected device to the workflow server 200 according to the selection. The workflow server 200 provides information on the work form list of the device stored in the storage unit 220 according to the request. The workflow server communication unit 414 of the host computer 400 receives the information on the work form list and a work form execution screen, and the work form execution unit 413 activates the work form execution screen.

When the user selects a desired work form from the work form list and inputs a command to execute the work form, the work form execution unit 413 of the host computer 400 transmits a command to request the execution of the work form to the workflow server 200 through the workflow server communication unit 414. The workflow server 200 provides the work form stored in the storage unit 220 to the host computer 400 according to the request. The workflow server communication unit 414 of the host computer 400 transmits the received work form to the device communication unit 411, and the device communication unit 411 transforms the work form to a command which can be recognized by the general multifunction device 100 and provides the command to the selected general multifunction device 100 using a corresponding driver stored in the driver storage unit 401. The general multifunction device 100 performs predetermined work (workflow function) according to the received command and provides the work result and a work form to indicate whether the work is performed to the host computer 400.

The host computer 400 transmits the work result and the work form to indicate whether the work is performed to the workflow server 200. At this time, in the work form to indicate whether work is performed, work which is performed and work which is not performed by the general multifunction device are distinguished. Here, the work which is not performed indicates work which cannot be performed by the general multifunction device. Then, the workflow server 200 performs the remaining work on the basis of the work result and a setting state of the work form.

Hereinafter, a workflow system and a method of controlling the same according to another embodiment of the present general inventive concept will be described with reference to FIGS. 6 to 10.

Figure 6:
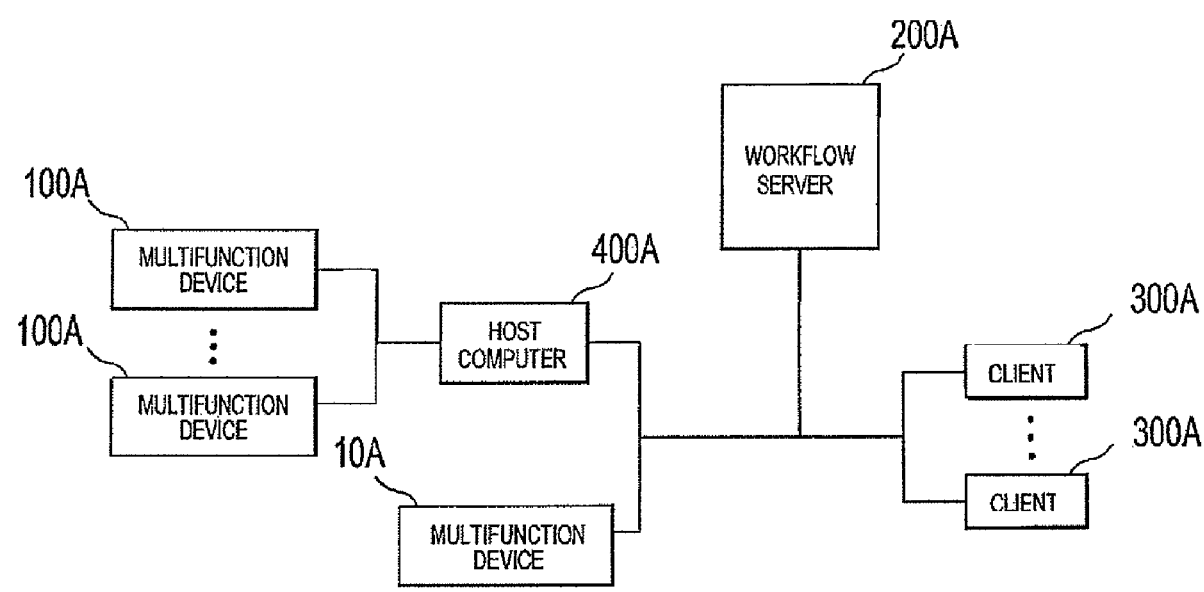
FIG. 6 is a block diagram illustrating a connection between a general multifunction device having no work form to perform a workflow function and a workflow server using a host computer according to another embodiment of the present general inventive concept.

As illustrated in FIG. 6, this embodiment of the present general inventive concept is different from the above embodiment of the present general inventive concept in that a host computer directly communicates with the client. Accordingly, an operation to register a general multifunction device in the host computer and an operation to execute a workflow function of the general multifunction device can be performed using the client. Although the client is used, in order to allow the general multifunction device to perform the workflow function, a method of allowing the host computer to communicate with the workflow server so as to transmit the work form to the general multifunction device or transmitting the work result of the work form of the general multifunction device to the workflow server so as to perform the workflow function is similar to that of the embodiment of FIG. 1.

As illustrated in FIG. 6, the workflow system according to this embodiment of the present general inventive concept includes general multifunction devices 100A having no work form to perform a workflow function, a multifunction device 10A having a workflow function, a host computer 400A, a workflow server 200A, and clients 300A.

Figure 7:
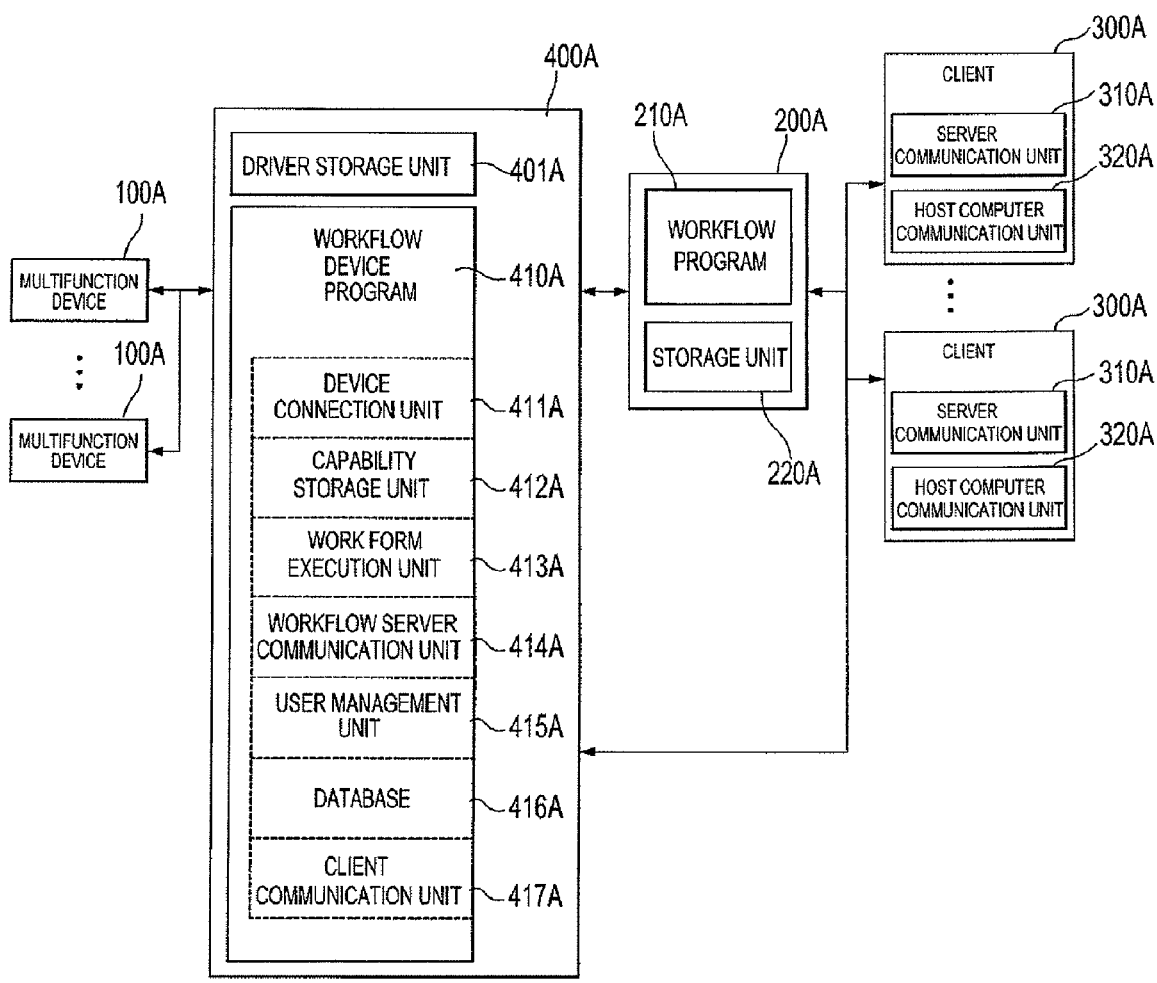
FIG. 7 is a detailed view illustrating in detail a configuration of the workflow system according to another embodiment of the present general inventive concept.

As illustrated in FIG. 7, the host computer 400A may include a driver storage unit 401A to store drivers of the multifunction devices and a workflow device program 410A to allow each of the general multifunction devices 100A to perform the workflow function.

The workflow device program 410A may include a device connection unit 411A to provide a user interface and a connection program to connect the multifunction devices and the workflow server 200A, a capability storage unit 412A to store information on capabilities of the multifunction devices such as the type of an image file and scan resolution according to models of the multifunction devices, and a work form execution unit 413A to provide a user interface and an execution program to execute workflow functions of the work forms of the multifunction devices.

The workflow device program 410A may further include a workflow server communication unit 414A to provide a communication program to communicate with the workflow server 200A, a user management unit 415A to provide a user interface and a user management program to generate and managing user information, and a database 416A to store information on connected devices, such as the multifunction devices and the user information.

The workflow device program 410A may further include a client communication unit 417A to provide a client communication program to communicate with the clients 300A.

Each of the clients 300A includes a server communication unit 310A to communicate with the workflow server 200A and a host computer communication unit 320A to communicate with the host computer 400A.

Figure 8:
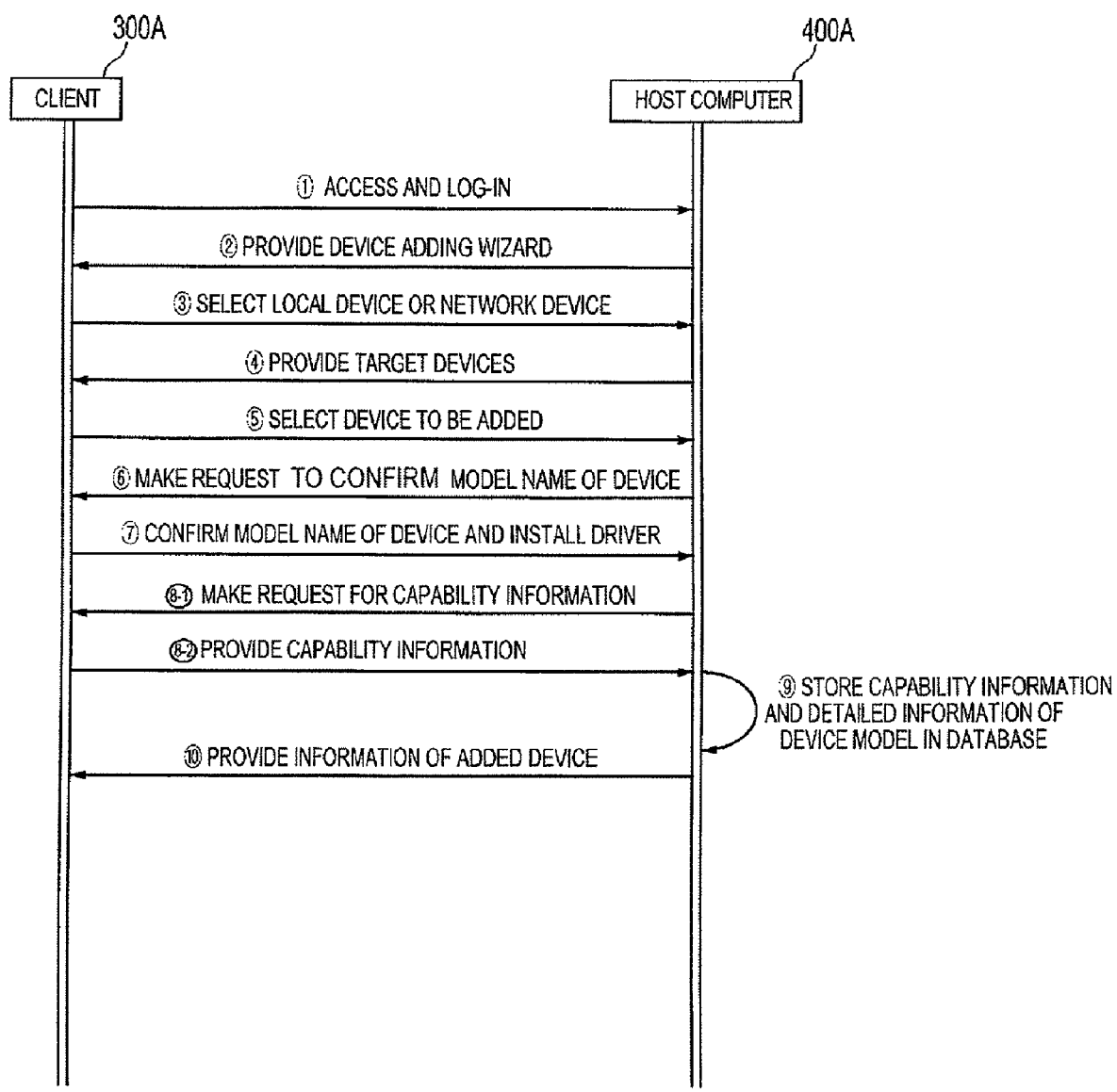
FIG. 8 is a view illustrating an operation to register a work form of the general multifunction device having no work form to perform a workflow function in the host computer according to another embodiment of the present general inventive concept.

An operation to register a general multifunction device 100A in the host computer will be described with reference to FIG. 8. Here, the registration of the general multifunction device 100A in the host computer 400A using the client indicates an operation to add an unregistered general multifunction device 100A as a new device.

When the client 300A accesses and logs in to the host computer 400A through the host computer communication unit 320A and selects a device adding menu in a main menu provided by the host computer 400A, the device connection unit 411A provides a device adding wizard to the client 300A. The client 300A selects whether the multifunction device to be added is a local device or a network device, on a screen provided by the device adding wizard.

Then, the device connection unit 411A provides the selected target devices. The client 300A selects a device to be added from the target devices. Next, the host computer 400A makes a request to confirm a model name of the selected device, and notifies the client that a driver of the device selected by the client should be newly installed in the host computer 400A when the client 300A confirms the model name of the device. The driver of the device which is newly installed is stored in the driver storage unit 401A. The installation of the driver is not compulsory, that is, the driver is installed only when the driver of the device selected by the client is not included in the host computer.

Subsequently, the device connection unit 411A reads capability information of the device to be added from the capability storage unit 412A. At this time, when the capability information is not stored, the client 300A is requested to provide the capability information. When the capability information is acquired, the device connection unit 411A stores the capability information and detailed information of the device to be added in the database 416A. The detailed information includes connection information of a network such as an IP address of the device. The device connection unit 411A opens a device status window and provides and displays the added device on a screen of the client 300A. Then, the device adding wizard is finished.

Figure 9:
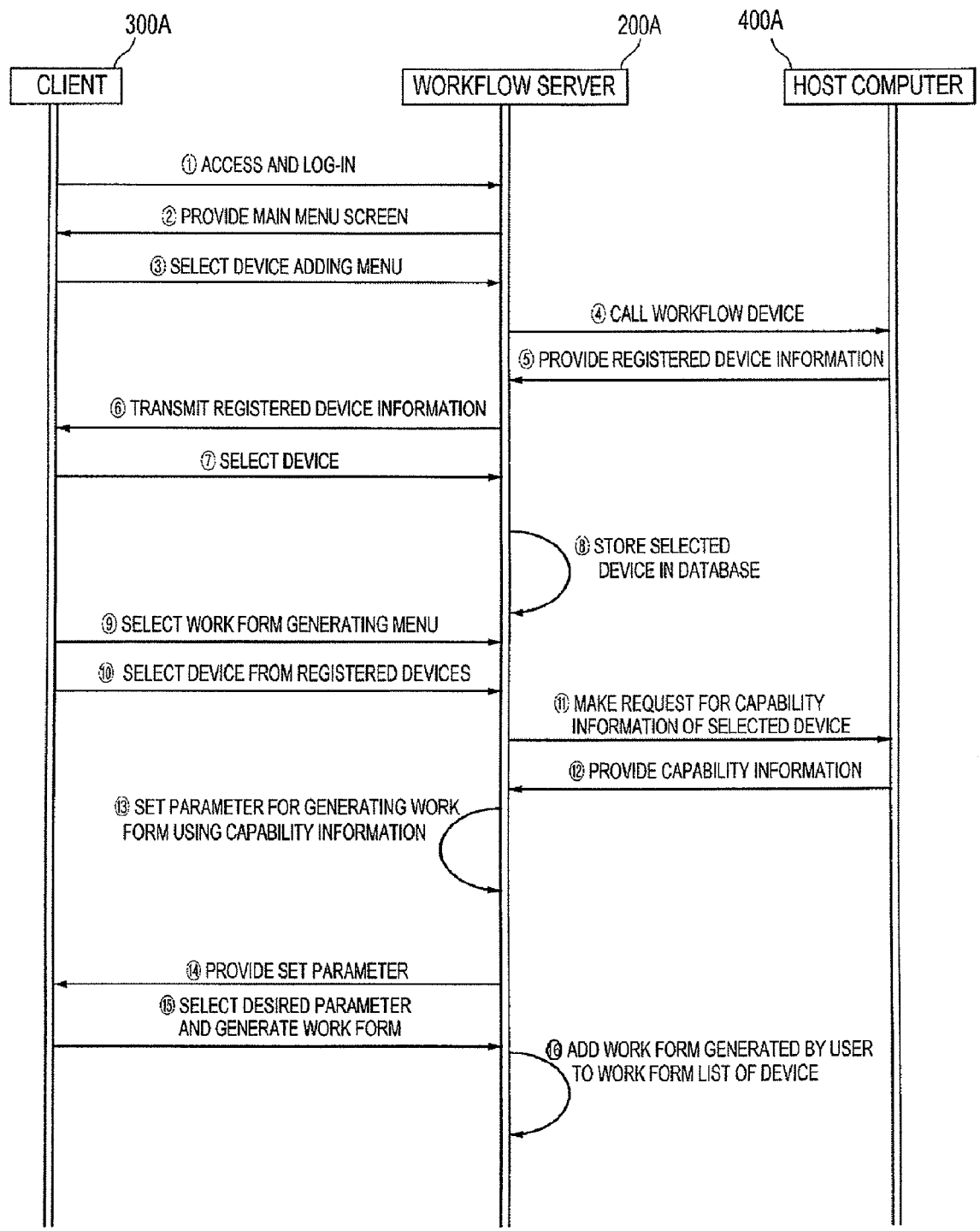
FIG. 9 is a view illustrating an operation to register the work form of the general multifunction device having no work form to perform a workflow function in the workflow server according to another embodiment of the present general inventive concept.

When the general multifunction device 100A is registered in the host computer 400A using the client, an operation to add a work form, which is information to indicate the workflow function of the general multifunction device 100A, to the workflow server 200 is necessary. Accordingly, as illustrated in FIG. 9, an operation to generate a work form using the client 300A is necessary. At this time, the client 300A communicates with the workflow server 200 using the server communication unit 310A.

Referring to FIG. 9, the client 300A accesses and logs in to the workflow server 200A and the workflow server 200A provides a main menu. The client 300A selects a device adding menu in the main menu, and the workflow server 200A calls the multifunction device having the workflow function through broadcasting in response to the selection of the client. At this time, by the calling of the workflow server 200A, the host computer 400A transmits device information registered in the database 416A to the workflow server 200A through the workflow server communication unit 414A. The workflow server 200A transmits the received device information to the client 300A. The client 300A selects a general multifunction device having no work form to perform a workflow function, which is the device to be added, from the device information displayed on the screen.

When the device is selected by the client 300A, the workflow server 200A stores the selected device in the storage unit 220A. The client 300A selects a work form generating menu and selects a device, of which the work form is desired to be generated, from the registered devices. The workflow server 200A makes a request for the capability information of the selected device to the host computer 400A. The workflow server communication unit 414A of host computer 400A transmits the capability information of the device registered in the database 416A to the workflow server 200A.

The workflow server 200A sets the scan resolution and the type of the image file as parameters to define a work form which will be generated using the received capability information of the device, and provides the set parameters to the client 300A. The client 300A selects a desired parameter from the received parameters, selects whether a transformation operation is performed or not, selects a destination, and generates the work form. The workflow server 200A stores the work form generated by the client 300A in the storage unit 220A. The storage unit 220A adds the work form of the multifunction device generated by the client to a work form list of the device.

After the general multifunction device 100A is registered in the host computer 400A and the work form of the general multifunction device 100A is generated and registered, the general multifunction device 100A can perform the workflow function.

Figure 10:
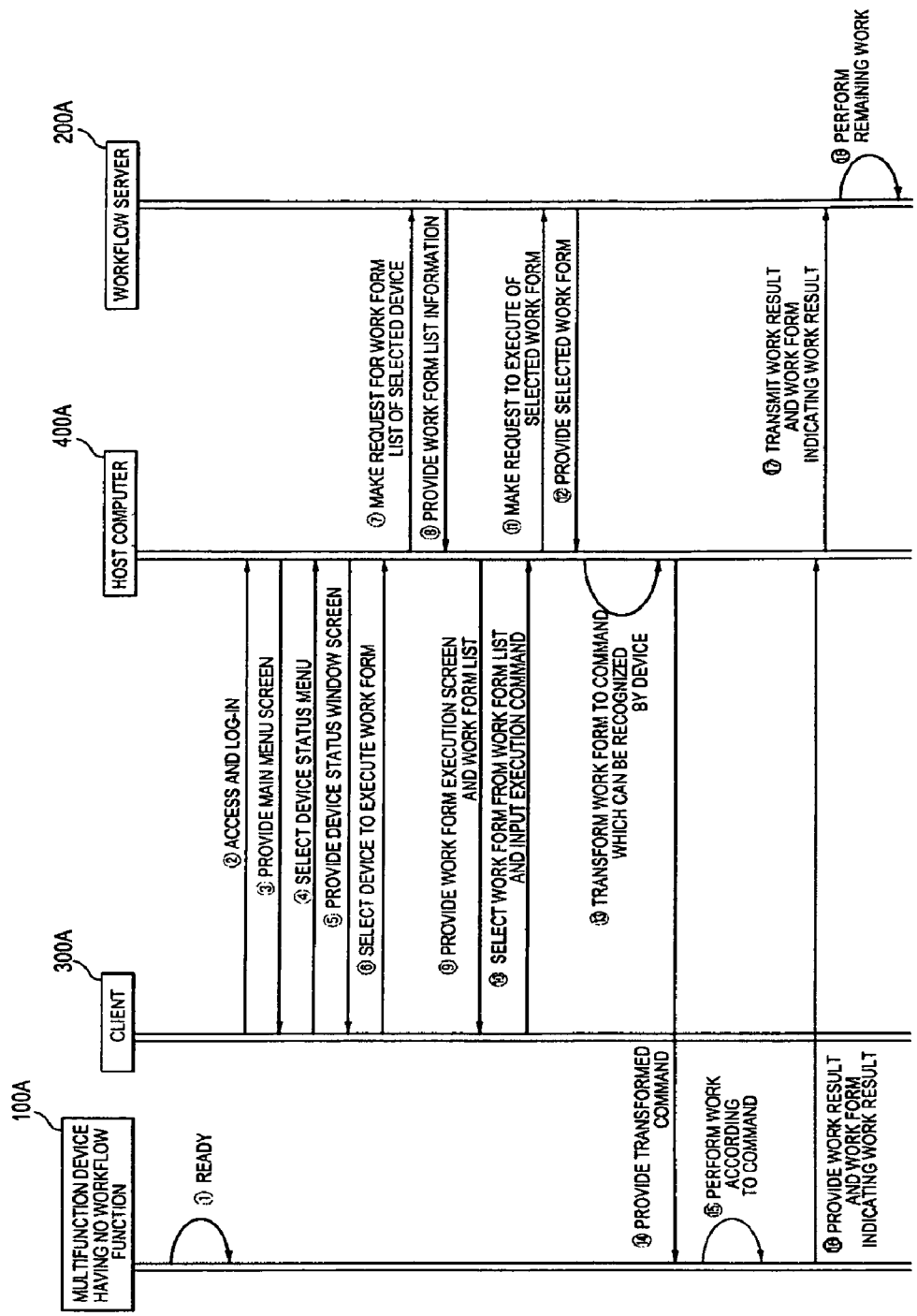
FIG. 10 is a view illustrating an operation to execute the work form of the general multifunction device having no work form to perform a workflow function according to another embodiment of the present general inventive concept.

Hereinafter, an operation to perform the workflow function between the workflow server 200A and the general multifunction device 100A through the host computer 400A according to the instruction of the client 300A will be described with reference to FIG. 10.

When the general multifunction device 100A is ready to scan a document, the client 300A accesses and logs in to the host computer 400A. Then, when the menu is requested, the host computer 400A provides the main menu. When the client 300A selects a device status menu in the main menu, host computer 400A provides a device status window screen. The client 300A selects a general multifunction device 100A having no work form to perform a workflow function, which will perform the workflow function, and the host computer 400A makes a request for the work form list of the selected device to the workflow server 200A according to the selection. The workflow server 200A provides information on the work form list of the device stored in the storage unit 220A according to the request. The workflow server communication unit 414A of the host computer 400A transmits the information on the work form list and a work form execution screen to the client 300A and the work form execution unit 413A of the host computer 400A activates the work form execution screen.

Then, the client 300A selects a desired work form from the work form list and inputs a command to execute the work form.

The work form execution unit 413A of the host computer 400A transmits a command to request the execution of the work form to the workflow server 200A through the workflow server communication unit 414A. The workflow server 200A provides the work form stored in the storage unit 220A according to the request. The workflow server communication unit 414A of the host computer 400A transmits the received work form to the device communication unit 411A, and the device communication unit 411A transforms the work form to a command which can be recognized by the general multifunction device 100A and provides the command to the selected general multifunction device 100A using a corresponding driver stored in the driver storage unit 401A. The general multifunction device 100A performs predetermined work (workflow function) according to the received command and provides the work result and a work form to indicate whether the work is performed to the host computer 400A.

The host computer 400A transmits the work result and the work form to indicate whether the work is performed to the workflow server 200A. Then, the workflow server 200A performs the remaining work on the basis of the work result and a setting state of the work form.

As described above, according to the present general inventive concept, an image forming apparatus, in which a network function to connect to a workflow server or a workflow function is not equipped at the time of shipping products, can perform a workflow function using a host computer having a workflow device program recorded thereon.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A workflow system comprising:
    a server image forming apparatus;
    a host image forming apparatus different from the server image forming apparatus and having no work form to perform a workflow function;
    a server to store a work form of the host image forming apparatus; and
    a host computer connected between the host image forming apparatus and the server,
    wherein the host computer sends at least one of the work form to the host image forming apparatus such that the host image forming apparatus performs the workflow function after receiving the work form, and a work result of the work form of the host image forming apparatus to the server.

2. The workflow system according to claim 1, wherein the host computer comprises the workflow device program to allow the server to perform the workflow function using the host image forming apparatus.

3. The workflow system according to claim 2, wherein the workflow device program comprises:
    a device connection unit to provide a user interface and a connection program to connect the host image forming apparatus and the server;
    a capability storage unit to store information on capability of the host image forming apparatus;
    a work form execution unit to provide a user interface and an execution program to execute the work form of the host image forming apparatus;
    a workflow server communication unit to provide a communication program to communicate with the server;
    a user management unit to provide a user interface and a user management program to generate and manage user information; and
    a database to store the user information and information on connected devices.

4. The workflow system according to claim 1, wherein the host computer transforms the work form sent from the server to a form which can be recognized by the host image forming apparatus.

5. The workflow system according to claim 1, further comprising:

a client connected to the server to generate and register the work form of the host image forming apparatus.

6. A method of controlling a workflow system, comprising:

executing a work form directly at host multifunction devices having a workflow function capability in response to receiving the work form;

requesting, through a host computer connected between the host multifunction devices and a workflow server, to the workflow server to transmit the work form to host multifunction devices not having work forms to provide the workflow function capability; and executing a workflow function using the host multifunction devices not having the work forms to provide the workflow function capability by using the transmitted work forms.

7. The method of claim 6, wherein the workflow server obtains the work form from a work form list stored therein.

8. The method of claim 6, wherein the workflow server performs any work which cannot be performed by the host multifunction devices.

9. A workflow system comprising:
a server image forming apparatus;
a host image forming apparatus having no work form to perform a workflow function;
a server to store a work form of the host image forming apparatus; and
a host computer connected to the host image forming apparatus and the server to transmit the work form between the host image forming apparatus and the server to enable the host image forming apparatus to perform the workflow function with respect to the work form,
wherein the host image forming apparatus performs the workflow function corresponding to the work form after receiving the work form from the host computer.

10. A method of controlling a workflow system, comprising:
storing a work form of an image forming apparatus in a server;
transmitting the work form from the server to a host image forming apparatus having no work form to perform a workflow function using a host computer; and
executing a workflow function of the work form using the host image forming apparatus and a workflow program of the host computer.

\* \* \* \* \*